June 22, 1937.  A. L. DORRELL  2,084,949
PISTON
Filed Jan. 17, 1934
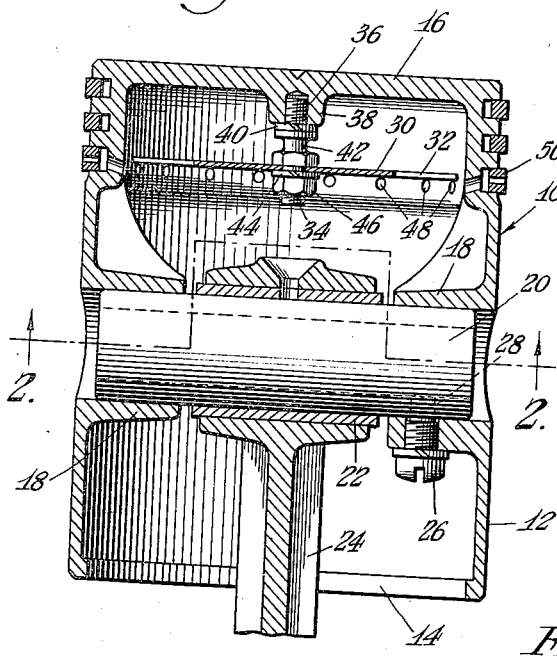
Fig. 1.
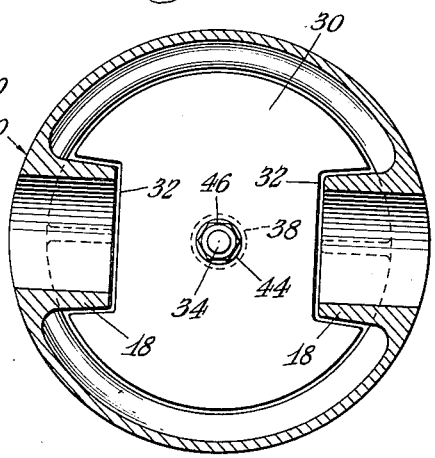
Fig. 2.
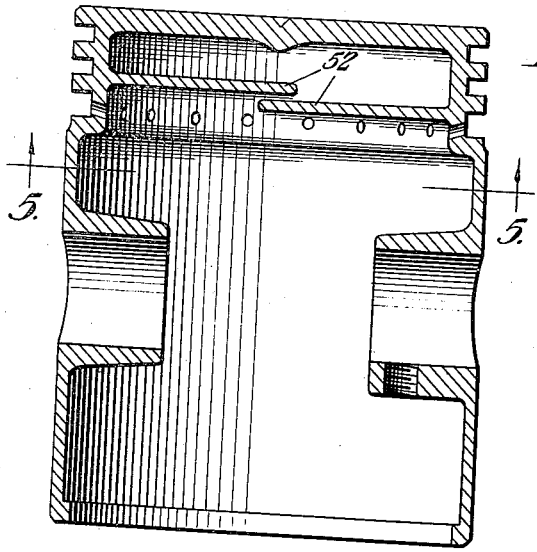
Fig. 4.
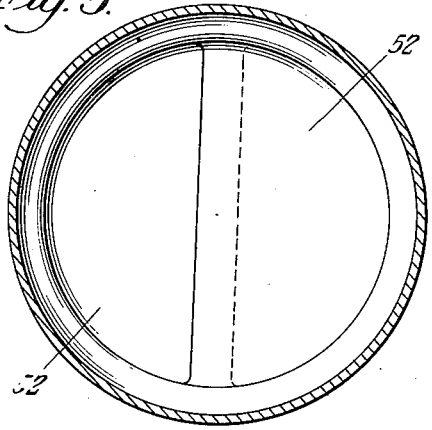
Fig. 3.
Fig. 5.
Alva L. Dorrell
INVENTOR
BY Victor J. Evans & Co.
HIS ATTORNEYS Patented June 22, 1937

UNITED STATES PATENT OFFICE 2,084,949

PISTON

Alva L. Dorrell, Chicago, Ill.

Application January 17, 1934, Serial No. 707,023

1 Claim. (Cl. 309—21)

My invention relates to internal combustion engines and has among its objects and advantages the provision of an improved piston.

This invention also consists in certain other features of construction and in the combination and arrangement of the several parts, to be hereinafter fully described, illustrated in the accompanying drawing and specifically pointed out in the appended claims.

In describing my invention in detail, reference will be had to the accompanying drawing wherein like characters denote like or corresponding parts throughout the several views, and in which:

Fig. 1 is a sectional view of the piston;

Fig. 2 is a sectional view taken along the line 2—2 of Fig. 1;

Fig. 3 is a detail view of the fastening screw for the baffle;

Fig. 4 is a sectional view of another form; and

Fig. 5 is a sectional view taken along the line 5—5 of Fig. 4.

In the embodiment selected to illustrate my invention I make use of a piston 10 comprising a skirt 12 open at 14 and provided with a flat head 16. This piston is provided with the usual bearings 18 supporting the ends of a wrist pin 20 having a tubular bushing 22 mounted thereon and connected with the upper end of a piston rod 24. I show a screw 26 extending into a hole 28 in the wrist pin, to prevent rotary movement of the pin in the bearings 18. The structure described so far is old.

My invention is directed to a baffle plate 30 extending across the cylinder in spaced relation with the head 16. Referring to Fig. 2, the plate 30 is cut out at 32 to permit the plate to be positioned beyond the bearings 18 and fastened to a screw 34 threaded into an opening 36 in a boss 38 cast integrally with the head 16.

I place a lock washer 40 between the end of the boss 38 and one end of a flanged sleeve 42 mounted upon the screw 34 and bearing against the plate 30 to prevent loosening of the sleeve 42 or the screw 34 when the sleeve is screwed down. A lock washer 44 is placed adjacent the opposite side of the plate 30 and the plate is firmly connected with the screw 34 through the medium of a nut 46. Fig. 3 illustrates the screw 34 and its associated parts. I prefer to mount the plate 30 immediately above the oil openings 48 in the skirt of the piston associated with the oil ring 50.

The temperature of the head frequently becomes so high that the oil caused to burn by striking the head intensifies the heat of the head, thereby reducing the strength of the piston to a dangerous point. Oil burned by striking the head of the piston leaves a carbon deposit in the piston. Some of this carbon deposit falls off the head and collects in the crank case and mixes with the oil, with the result that the lubricating qualities of the oil are materially decreased. My baffle plate eliminates the formation of such carbon in that the plate prevents oil of the crank case from splashing upwardly from the crank case from being thrown into contact with the hot head of the piston.

It will be noted that the plate 30 is slightly smaller in diameter than the inner diameter of the skirt 12, thus providing an air space between the edge of the plate and the inner wall of the skirt. This space together with the openings 32 permits air to circulate into the space between the plate 30 and the head 16, which air tends to cool the head.

Referring to Fig. 2, the openings 32 are arranged in vertical alignment with the bearings 18, so that the bearings act as baffle elements preventing oil from splashing through the openings 32. In mounting the baffle plate 30 by means of a single bolt in spaced relation with skirt 12, I provide a construction in which the transmission of heat from the piston to the baffle plate is reduced to a minimum. In other words, the heat transmitted from the piston to the plate is limited to the process of radiation. A construction according to Fig. 1 is easily associated with pistons of conventional design by merely providing sufficient material for the threaded opening to receive the pin 34.

In the construction illustrated in Figs. 4 and 5, the piston is provided with two integral baffles 52 arranged in spaced and overlapping relation. This construction provides a complete seal against any oil thrown into the piston, but permits the circulation of air adjacent the head of the piston.

Without further elaboration the foregoing will so fully explain my invention that others may, by applying current knowledge, readily adapt the same for use under various conditions of service.

I claim:

In a piston construction comprising a head and a skirt, a baffle plate mounted within the skirt in spaced relation with the head and having an opening, a screw threadedly related to the head and extending through said opening, a lock washer mounted upon the screw adjacent the head, a sleeve mounted upon said screw and having abutting relation with said lock nut and the baffle plate, a second lock nut mounted upon the screw adjacent the opposite side of the baffle plate, and a nut having threaded relation with the screw and abutting the second washer.

ALVA L. DORRELL.